Oct. 8, 1968  S. J. HOWARD ETAL  3,404,423
WINDSHIELD CLEANING APPARATUS
Filed June 24, 1965  2 Sheets-Sheet 1

INVENTORS.
SHELDON J. HOWARD and
WILLIAM C. RIESTER.
BY E. Herbert Liss
ATTORNEY.

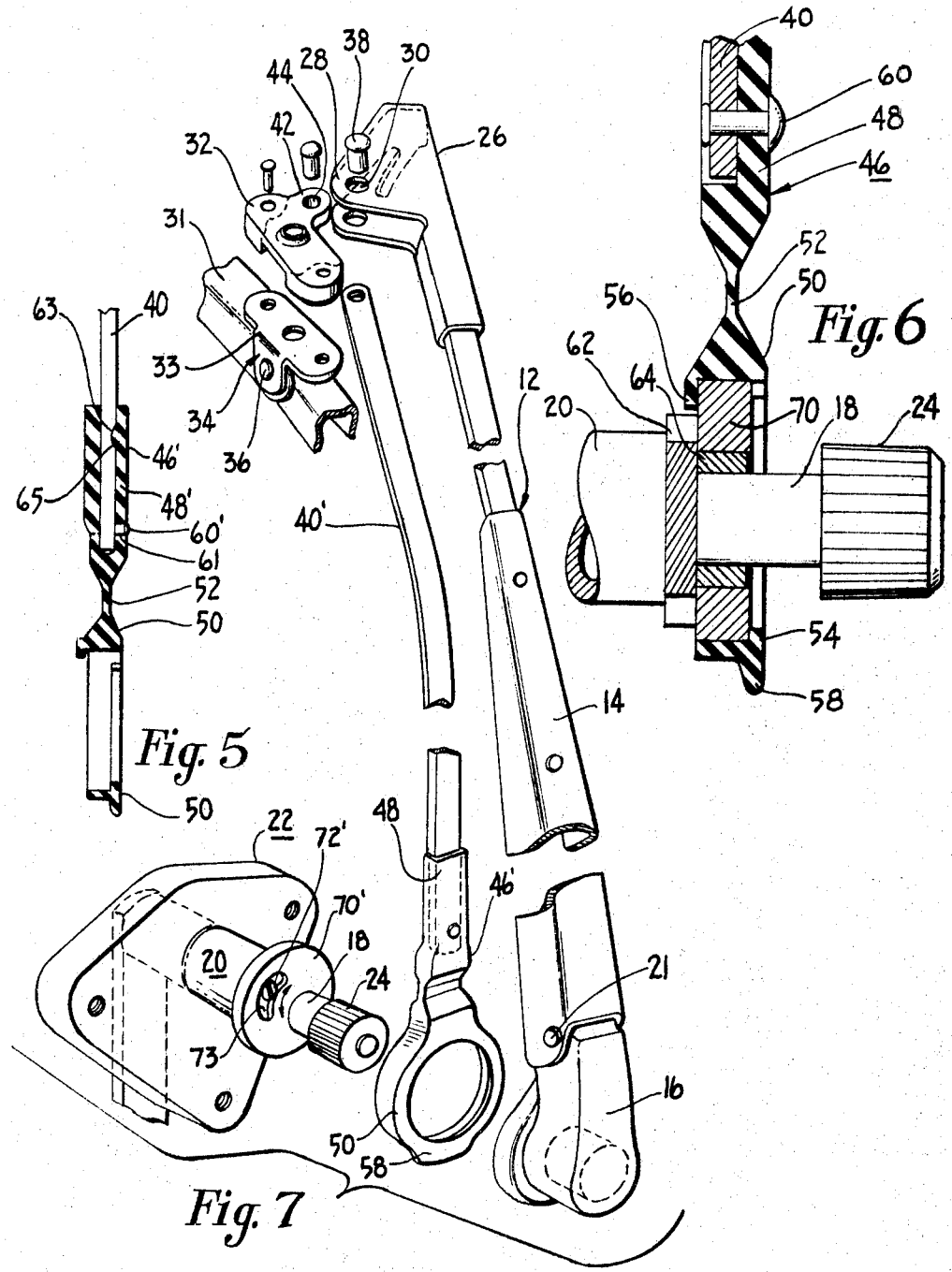

United States Patent Office 3,404,423
Patented Oct. 8, 1968

3,404,423
WINDSHIELD CLEANING APPARATUS
Sheldon J. Howard, Buffalo, and William C. Riester, Williamsville, N.Y., assignors to Trico Products Corporation, Buffalo, N.Y.
Filed June 24, 1965, Ser. No. 466,685
4 Claims. (Cl. 15—250.23)

ABSTRACT OF THE DISCLOSURE

A windshield wiper blade pivotally mounted relative to a windshield wiper arm on a first axis for oscillation in a plane parallel to the windshield and pivotally mounted on a second axis for movement in a plane perpendicular to the windshield. An actuator rod mounted eccentrically with respect to the wiper arm pivot shaft at one end and on an axis parallel to the second axis at its other end, but displaced from the pivotal axis of the blade, actuates the blade on its pivotal axis relative to the arm as the wiper traverses its path.

---

The present invention relates to an improved windshield wiper apparatus for motor vehicles and, more particularly, to a windshield wiper arm and blade combination in which the blade pivots relative to the arm as the wiper traverses the wiping path.

Modern windshields having converging lateral outboard edges are substantially wider at the base or lower edge adjacent the cowl of the vehicle than at the top or upper edge adjacent the roof line. With these newer type windshields, the windshield wipers generally in use leave a substantial unwiped angular area adjacent the outboard portion of the viewing area of the windshield. This is because the longitudinal axis of the blade is held fixed with respect to the longitudinal axis of the arm on an axis perpendicular to the glass. Thus the inner end of the blade traverses a smaller arc than the outer end of the blade.

The present invention utilizes a construction wherein apparatus is provided on the arm which controllably pivots the blade relative to the longitudinal axis of the arm on an axis perpendicular to the glass as it traverses the wiping path. This construction cleans a triangular area of the lower outboard section of the windshield otherwise left unwiped by conventional wiper construction. In the present invention, controlled positive movement of the blade about an axis perpendicular to the glass tends to drive the blade in a path approaching a horizontal path, thus decreasing the differential between the length of the arc at the upper and lower edges of the wiping path. Negligible uncleared area remains at the outboard portion of the windshield.

Arm constructions are known which accomplish this objective. The present invention, however, provides an improved arm and blade combination in which the wiping pattern can be oriented to various windshields of diverse shapes and sizes, which can be readily removed for repair or replacement, and which can follow irregularities, rises and falls in the contour of a curved glass shield. The construction of the present invention also facilitates installation and provides increased useful life and smoother operation of the assembly.

The principal object of the present invention is to provide improved wiper apparatus for wiping a windshield having upwardly converging side edges wherein positive control of blade oscillation relative to the arm is achieved and wherein the blade can follow irregularities, rises and falls in the contour of the glass.

Another object of the invention is to provide improved windshield wiper apparatus wherein positive controlled blade oscillation relative to the arm is achieved in which the wiping pattern can be oriented to a multiplicity of diverse shapes and sizes of windshields.

Another object of the invention is to provide improved windshield wiper apparatus wherein positive controlled blade oscillation relative to the arm is achieved and wherein the arm and blade combination is readily removable for repair and replacement.

A further object of the invention is to provide improved windshield wiper apparatus for motor vehicles for wiping substantially the entire surface of a windshield having upwardly converging side edges which facilitates installation, is economical to produce and has a long useful life.

Other objects and advantages of the invention will be apparent from the following detailed description taken in connection with the accompanying drawings in which:

FIG. 5 is a view similar to FIG. 4 showing a modified embodiment of the connecting means;

FIG. 6 is a partial side elevational view partly in longitudinal cross section taken on line VI—VI of FIG. 2; and FIG. 7 is an exploded perspective view illustrating still another embodiment of the invention.

Briefly, the invention comprises a wiper blade having a wiper arm secured to the wiper blade on one arm of a bell crank lever for pivotal movement about an axis perpendicular to the surface to be wiped. That arm of the bell crank lever is pivotally secured to the blade superstructure centrally thereof about a transverse axis perpendicular to the pivotal axis between the wiper arm and the bell crank lever arm. The wiper arm has pivotally secured at its other end a mounting head portion which is secured to a motor driven pivot shaft for oscillation therewith. An actuating rod is connected at one end to the second arm of the bell crank lever for pivotal movement about an axis parallel to the axis between the wiper arm and the first bell crank lever arm. A hub having its outer periphery circumscribing the outer periphery of the pivot shaft is rigidly secured at the pivot shaft with its central axis displaced from the central axis of the pivot shaft. The actuating rod has connected at its end remote from its connection to the blade a bearing ring assembly of deformable material comprising a ring bearing in which the hub is journaled and a connector hinged to the ring bearing for connecting the bearing assembly to the actuating rod. The connector may be permanently connected to the actuating rod or removably connected. The hub may be secured to the pivot shaft body rigidly, integrally therewith or it may be adjustably secured to the pivot body so that its axis can be moved relative to the axis of the pivot shaft to accommodate the assembly to various shapes and sizes of windshields.

When the pivot shaft oscillates and the wiper arm oscillates with it in the usual manner, the actuating rod oscillates about the axis of the hub. Since the wiper arm and the actuating rod are oscillating about separate axes, it should be apparent that the actuating rod will cause oscillation of the wiper blade relative to the wiper arm, thus enabling the inner end of the wiper blade to move outwardly as it approaches the outward side of the windshield. A reverse movement of the blade relative to the arm is obtained as the wiper arm moves inwardly toward the cowl of the motor vehicle. Since the hub circumscribes the pivot shaft, it can be seen that the central axis of the hub can be located in diverse positions including a position very close to or even within the pivot shaft. This permits optimum orientation of the wiping pattern regardless of the shape or size of the windshield. The large bearing surface between the hub and the ring bearing resulting from this construction provides smoother operation and long operating life. The ring bearing includes a radially inwardly extending lip at its upper surface and its lower surface to prevent axial displacement of the bearing relative to the pivot shaft. The lip construction together with the deformable characteristics of the ring bearing material facilitate mounting and removal of the arm structure.

Figure 1:
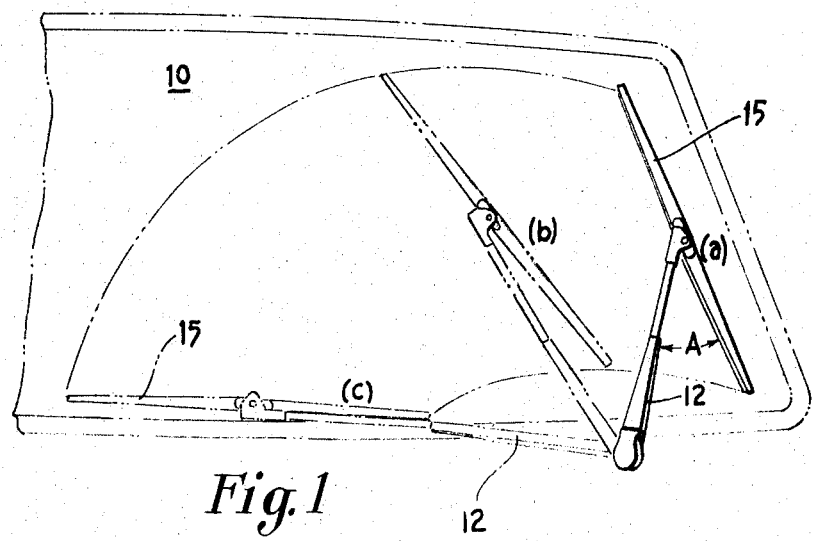
FIG. 1 is a perspective view of a windshield incorporating the wiper construction of the present invention showing the wiper in various positions during oscillation.

In FIG. 1 there is shown a contoured panoramic windshield 10. Mounted adjacent the lower edge of the windshield for oscillatory pivotal movement are a pair of wiper arms 12 (one of which is shown), each having secured at its outer end a wiper blade 15. The arm and blade is shown in its outboard position in full line at a, at an intermediate position in broken line at b, and in the parked position c in broken line. The wiper arm of the instant invention is illustrated for use in a windshield cleaner combination including a conventional pivot shaft 18 mounted in a bearing housing 20 of a pivot shaft body 22. The pivot shaft body 22 may be secured to the cowl of the vehicle in any suitable or desirable manner. The pivot shaft 18 includes a drive burr 24 mounted at the free end of pivot shaft 18 for movement therewith. The pivot shaft 18 may be driven by a motor of any suitable or desirable type (not illustrated). For purposes of illustration, a two section arm is employed having an outer section 14 and a mounting section 16. The mounting section is mounted on the driving burr 24 of the pivot shaft 18 for oscillation therewith. The sections 14 and 16 may be pivotally connected at at 21 and a biasing spring arrangement, not shown, of a known or suitable form may be provided for urging the outer arm section 14 toward the surface of the windshield 10 in a known manner.

The wiper blade 15 may be of any of various known types utilizing a superstructure 31 and a flexible wiper element for conforming to the surface of a curved windshield. The outer arm section 14 has secured to the free end thereof in any suitable or desirable manner a blade connector 26 which includes a pivot ear 28 having a pivot pin opening 30 displaced laterally from the longitudinal axis of the outer arm section 14. The blade includes a connector element or lever 32 which is in the form of a bell crank lever. The bell crank lever 32 is pivotally connected to the arm by a mounting element 33 having a pair of ears 34 and a pin 36 for pivotal movement relative to the arm about a transverse axis perpendicular to the longitudinal axis of the blade. The outer arm section 14 is connected to one arm 37 of the bell crank lever 32 at the pivot receiving opening 30 by a pivot pin 38 on a vertical axis located centrally of the blade superstructure 31 perpendicular to the longitudinal axis thereof. An actuating rod 40 is pivotally connected adjacent the free end of the other arm 42 of the bell chank lever 32 as at 44. At its other end, the actuating rod 40 is connected for pivotal movement about an axis parallel to but spaced from the axis of the pivot shaft 18, as will be hereinafter explained in greater detail.

Figure 2:
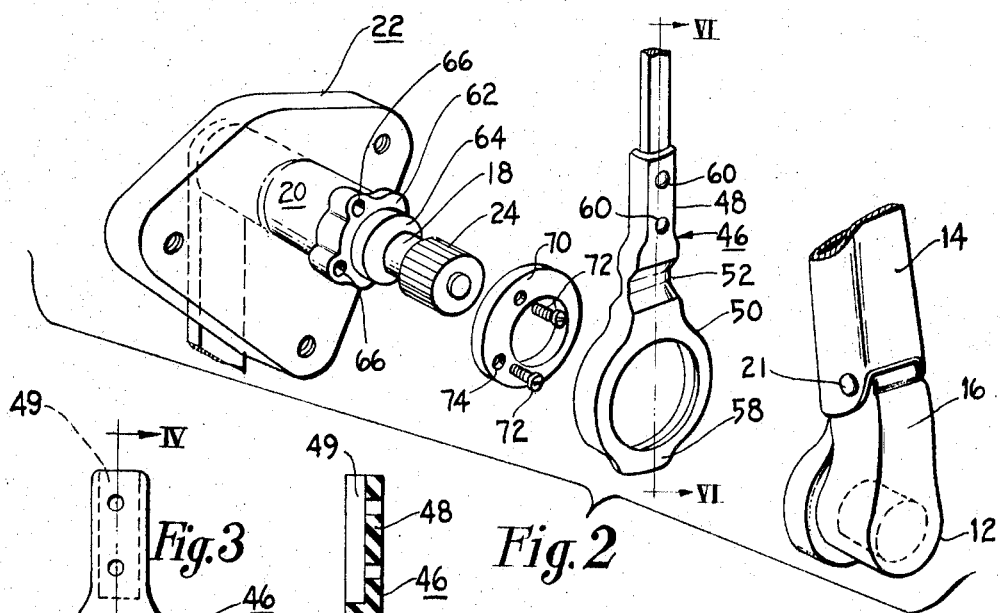
FIG. 2 is an exploded partial perspective view of the wiper construction of this invention.
Figure 3:
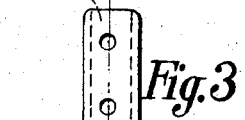
FIG. 3 is a top elevational view of the bearing ring assembly and connector of this invention.
Figure 4:
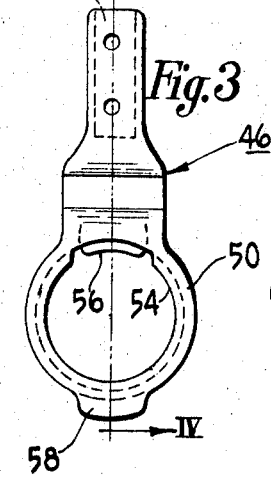
FIG. 4 is a sectional view taken on line IV—IV of FIG. 3 illustrating the connecting means of FIG. 3.

As illustrated in FIG. 2, the actuating rod 40 has at its end adjacent the pivot shaft 18 a bearing ring assembly 46, best shown in FIGS. 3 and 4. The bearing ring assembly 46 is of deformable material and preferably of deformable thermo plastic material, such as nylon, celcon and other suitable materials. The material for the bearing ring assembly 46 may be inherently anti-friction material or may be impregnated with a lubricant. The bearing ring assembly 46 comprises a connector 48 hingedly secured to a bearing ring 50 by a hinge section 52. As shown, the hinge section 52 is formed integrally with the bearing ring assembly as a section of reduced thickness. It will of course be understood that any suitable or desirable type of hinging may be employed. The bearing ring 50 includes a radially inwardly extending annular lip or flange circumscribing the inner periphery of the top surface with an open arcuate section adjacent the hinge portion. An inwardly extending radial flange 56 is provided on the lower surface opposite the open annular arcuate portion. A radially outwardly extending lip or tab 58 is provided coplanar with the flange 54 and diametrically opposite the flange 56. The connector 48 of the bearing ring assembly 46 includes a channel 49 which receives the free end of the operating rod 40 and is secured thereto in any suitable manner as, for example, by rivets 60 as shown in FIG. 2.

The bearing housing 20 may include a hub retaining flange 62 and a reduced cylindrical portion 64 at its free end thereof. The flange 62 may include a pair of internally threaded openings 66. A hub 70 having an opening displaced from the central axis of the hub receives the cylindrical section 64 therein and is retained by the flange 62. Thus, the central axis of the hub is parallel to but spaced from the central axis of the pivot shaft 18. The hub 70 is secured to the flange 62 by screws 72 passing through openings 74 in the hub and received in threaded openings 66 of the flange 62. It will of course be apparent that the hub 70 may be formed integral with the bearing housing 20 of the pivot body 22. The bearing ring 50 may be received on the hub 70 for pivotal movement and may be retained against axial displacement by the flange or lip 54 engaging the upper surface of the hub and the flange or lip 56 engaging the lower surface of the hub. The cut away portion of the flange 54 and the flexibility or deformability of the bearing ring material faciilties mounting and removability of the bearing ring 50 from the hub 70. The tab 58 is provided for facilitating mounting and removability. It provides a means for manually manipulating the bearing ring 50 during installation or removal.

In FIG. 5 a modification of the invention is shown which is identical in every respect to the embodiment shown in FIGS. 2, 3 and 4 except for the means of securing the actuating rod 40 to the connector 48' of the bearing ring assembly 46'. In the modification illustrated in FIG. 5, the actuating rod 40 is readily removable and utilizes a bayonet type connector wherein a protuberance 60' is provided adjacent the free end of the actuating rod 40 which engages an opening 61. The protuberance 60' and the opening 61 form inter-engaging shoulders. Likewise, an inwardly extending protuberance 63 on the inner wall of the connector engages a notch 65. The notch 65 and the protuberance 63 form inter-engaging shoulders. Because of the resiliency of the material from which the bearing ring assembly 46' is made, the actuating rod 40 can be snapped into place with the inter-engaging shoulders preventing displacement. For removal of the actuating rod 40, the rod 40 can be pressed in a direction to deform the material, permitting disengagement of the inter-engaging shoulders.

In FIG. 7 there is shown still another modification of the invention. The connections between the actuating rod 40 and the bell crank lever 32, as well as the arm 14 and the blade, are identical with the embodiment shown in FIG. 2. The connection between the actuating rod 40 and the bearing ring assembly 46' is shown identical to that illustrated in FIG. 5. It will of course be understood that in accordance with the broader aspects of the invention, the bearing ring assembly 46 illustrated in FIG. 2 may be utilized in the FIG. 7 modification as well as any other suitable or desirable connection. The FIG. 7 modification utilizes an adjustable construction for mounting the hub 70' on the pivot body bearing housing 20. A screw 72' is received in an internally threaded recess, not shown, on the pivot shaft bearing housing 20 through an arcuate slot 73 on the hub 70'. The hub 70' is rotatably mounted relative to the pivot shaft 18 and the position of its central axis can be adjusted with respect to the central axis of the pivot shaft 18 by rotating the hub 70' on the pivot shaft 18. The hub can then be retained in adjusted position by tightening the screw 72′. This permits final adjustment for obtaining the desired orientation of the wipe pattern and renders the arm and blade combination suitable for diverse sizes and shapes of windshields.

The operation of the device and the various modifications illustrated should now be apparent. Because the central axis about which the bearing ring 50 oscillates is spaced from the central axis of the pivot shaft 18, the actuating rod 40 will cause the blade 15 to pivot about the axis 38 as the arm 12 and blade 15 is oscillated from its parked or inboard position at *c* through the position *b* to the position *a*. As this occurs, the angle A will increase as the blade 15 moves from the inboard position *c* to the outboard position *a* to the inboard position *c*. This movement maintains the blade 15 within the glass area, but permits a broader sweep of the blade 15 across the windshield 10 and wipes a triangular area which would not otherwise be wiped.

The unique construction for connecting the operating rod 40 adjacent the pivot shaft axis by means of the novel bearing ring assembly 46 or 46′ and hub 70 or 70′ accomplishes a number of objectives. Versatility in location of the operating rod axis is achieved since with this construction the central axis of the hub may be located as close to the central axis of the pivot shaft 18 as desired and may be located even within the boundaries of the pivot shaft without creating interference between operation of the actuating rod 40 and the pivot shaft 18. By designing the desired eccentricity of the hub 70 or 70′ with respect to the central axis of the pivot shaft 18, the central axis about which the actuating rod 40 oscillates may be located at any desirable place and such location would depend upon the shape and size of the windshield as well as the location of the pivot shaft 18. Even further adjustment can be obtained with the FIG. 7 embodiment during final assembly by rotating the hub 70′ within the limits of the arcuate slot 73. The unique construction provides a large diameter pivotal connection between the actuating rod 40 and the hub 70 or 70′. The increased bearing area obtained thereby improves the anti-friction characteristics, resulting in smoother action. The large diameter of the hub and bearing assembly permits the bearing ring 50 to be snapped on and off, facilitating repair and replacement, as well as initial assembly. The hinge between the connector 48 or 48′ and the bearing ring 50 allows the actuating rod to flex at the hinge, thereby improving the ability of the arm and blade combination to follow irregularities, rises and falls in the glass. The hinged construction also permits service station attendants to raise the blade off the window for window cleaning without danger of damaging the arm. The use of this construction maintains the bearing ring in proper axial position since the unique engagement of the ring on the hub prevents axial displacement, thereby avoiding cocking of the ring and consequent binding.

Although certain specific embodiments of the invention have been shown and described for the purpose of illustration, it will be apparent that in its broader aspects, various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. In windshield wiper apparatus comprising a wiper arm adapted to be secured to a driven pivot shaft for oscillatory movement therewith; a wiper arm and blade combination including a wiper blade, means for connecting said blade to said arm about an axis of oscillation for oscillatory movement relative to the arm in a plane substantially parallel to the surface to be wiped and for pivotal movement about an axis transverse to the longitudinal axis of the blade, an actuating rod for producing said oscillatory movement, lever means for pivotally connecting one end of said actuating rod to said axis of oscillation at a point spaced therefrom, a hub mounted at said pivot shaft having its central axis adjacent to but spaced from the axis of the pivot shaft, said hub being adjustably mounted for varying the location of its axis and a bearing ring assembly secured to the other end of said actuating rod, said bearing ring assembly including a bearing for journaling said hub, said bearing including a lip for preventing axial movement of said bearing relative to said hub, and a connector hingedly connected to said bearing for securing the bearing ring assembly to the actuating rod.

2. The wiper arm and blade combination set forth in claim 1, wherein the bearing ring assembly is of flexible anti-friction material.

3. In windshield wiper apparatus comprising a wiper arm adapted to be secured to a driven pivot shaft for oscillatory movement therewith; a wiper arm and blade combination including a wiper blade, means for connecting said blade to said arm about an axis of oscillation for oscillatory movement relative to the arm in a plane substantially parallel to the surface to be wiped and for pivotal movement about an axis transverse to the longitudinal axis of the blade, an actuating rod for producing said oscillatory movement, lever means for pivotally connecting one end of said actuating rod to said axis of oscillation at a point spaced therefrom, a hub mounted at said pivot shaft having its central axis adjacent to but spaced from the axis of the pivot shaft and a bearing ring assembly for securing the actuating rod to said hub including a bearing for journaling said hub and connecting means including a first latching element on the other end of said actuating rod, a second latching element hingedly connected to said bearing, said latching elements being releasably engageable with each other.

4. In windshield wiper apparatus comprising a wiper arm adapted to be secured to a driven pivot shaft for oscillatory movement therewith; a wiper arm and blade combination including a wiper blade, means for connecting said blade to said arm about an axis of oscillation for oscillatory movement relative to the arm in a plane substantially parallel to the surface to be wiped and for pivotal movement about an axis transverse to the longitudinal axis of the blade, an actuating rod for producing said oscillatory movement, lever means for pivotally connecting one end of said actuating rod to said axis of oscillation at a point spaced therefrom, a hub mounted at said pivot shaft saving its central axis adjacent to but spaced from the axis of the pivot shaft and a bearing ring assembly for securing the actuating rod to said hub including a bearing for journaling said hub and connecting means for securing the bearing ring assembly to the actuating rod, said bearing including a radially inward extending lip for preventing axial displacement of said bearing relative to said hub.

References Cited

UNITED STATES PATENTS

| | | | |
|---|---|---|---|
| 2,800,676 | 7/1957 | Markela et al. | 15—250.23 |
| 2,871,501 | 2/1959 | Wernig | 15—250.23 |
| 3,076,991 | 2/1963 | Macpherson | 15—250.23 |

CHARLES A. WILLMUTH, *Primary Examiner.*